(12) United States Patent
Hessling-Von Heimendahl

(10) Patent No.: US 11,021,264 B2
(45) Date of Patent: Jun. 1, 2021

(54) ANTI-BIRD-COLLISION LIGHT

(71) Applicant: Goodrich Lighting Systems GmbH, Lippstadt (DE)

(72) Inventor: Andre Hessling-Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 536 days.

(21) Appl. No.: 15/648,521

(22) Filed: Jul. 13, 2017

(65) Prior Publication Data
US 2018/0016030 A1 Jan. 18, 2018

(30) Foreign Application Priority Data
Jul. 15, 2016 (EP) .................................... 16179700

(51) Int. Cl.
| *B64D 47/02* | (2006.01) |
| *B60Q 1/46* | (2006.01) |
| *A01M 29/10* | (2011.01) |
| *B60Q 1/24* | (2006.01) |
| *B64D 45/00* | (2006.01) |

(52) U.S. Cl.
CPC ............. *B64D 47/02* (2013.01); *A01M 29/10* (2013.01); *B60Q 1/245* (2013.01); *B60Q 1/46* (2013.01); *B64D 2045/0095* (2013.01); *B64D 2203/00* (2013.01)

(58) Field of Classification Search
None
See application file for complete search history.

(56) References Cited

U.S. PATENT DOCUMENTS

| 2,162,517 | A | * | 6/1939 | Peters | .................. | G01S 1/72 |
| | | | | | | 362/383 |
| 2,576,875 | A | * | 11/1951 | Vermeulen | ........... | F21S 41/689 |
| | | | | | | 362/269 |
| 2,712,060 | A | * | 6/1955 | Johnson | ................. | B60Q 1/245 |
| | | | | | | 362/419 |
| 4,736,907 | A | | 4/1988 | Steffen | | |
| 4,995,722 | A | * | 2/1991 | Sutour | ..................... | B64F 1/12 |
| | | | | | | 244/17.17 |
| 5,270,707 | A | | 12/1993 | Schulte et al. | | |
| 5,673,050 | A | * | 9/1997 | Moussally | .......... | G01S 13/0209 |
| | | | | | | 342/22 |
| 6,183,108 | B1 | * | 2/2001 | Herold | ................ | B60Q 1/0483 |
| | | | | | | 362/244 |

(Continued)

FOREIGN PATENT DOCUMENTS

| EP | 0236267 A2 | 9/1987 |
| EP | 2832647 A1 | 2/2015 |
| EP | 3012151 A1 | 4/2016 |

OTHER PUBLICATIONS

European Search Report for Application No. 16179700.6-1756, dated Jan. 4, 2017, 14 pages.

(Continued)

*Primary Examiner* — Rajarshi Chakraborty
*Assistant Examiner* — Fatima N Farokhrooz
(74) *Attorney, Agent, or Firm* — Cantor Colburn LLP

(57) ABSTRACT

A helicopter anti-bird-collision system including a search light (2) and a control unit (35) which is configured for operating the search light (2) in a flash light mode by switching the search light periodically on and off.

10 Claims, 3 Drawing Sheets

(56) References Cited

U.S. PATENT DOCUMENTS

| | | | |
|---|---|---|---|
| 6,940,424 B2 | 9/2005 | Philiben et al. | |
| 7,414,546 B2 | 8/2008 | Singer | |
| 7,645,053 B2 | 1/2010 | Machi | |
| 8,123,377 B2 | 2/2012 | Lundberg | |
| 8,836,541 B2* | 9/2014 | Fidanza | B64D 47/04 340/946 |
| 9,260,201 B2* | 2/2016 | Hessling | F21V 13/02 |
| 2003/0090391 A1 | 5/2003 | Philiben et al. | |
| 2012/0140498 A1* | 6/2012 | Fabbri | B64D 47/04 362/470 |
| 2012/0248254 A1* | 10/2012 | Domergue | B64C 13/50 244/175 |
| 2013/0182449 A1 | 7/2013 | Fidanza | |
| 2013/0215268 A1* | 8/2013 | Nouvel | G06K 9/3233 348/144 |
| 2014/0321135 A1 | 10/2014 | Chen et al. | |
| 2015/0036365 A1 | 2/2015 | Schoen et al. | |
| 2016/0029615 A1 | 2/2016 | Newcamp et al. | |
| 2016/0107767 A1 | 4/2016 | Jha et al. | |

OTHER PUBLICATIONS

R. Steffen: "Anti-Bird Collision (ABC) Light System to Prevent Bird Strike in Aviation Cost-Cause-Solution", 22nd Bird Strike Committee Europe Confernce, Sep. 2, 1994, pp. 63-67.

* cited by examiner

ANTI-BIRD-COLLISION LIGHT

FOREIGN PRIORITY

This application claims priority to European Patent Application No. 16 179 700.6 filed Jul. 15, 2016, the entire contents of which is incorporated herein by reference.

TECHNICAL FIELD

The present invention is in the field of exterior helicopter lighting. The present invention in particular relates to using a helicopter search light as an anti-bird-collision light for avoiding collisions between a helicopter and birds crossing the path of the helicopter.

BACKGROUND

The problem of bird strike, i.e. the problem of collisions between an aircraft such as a helicopter and birds crossing the pathway of the flying aircraft, has been known for a long time. Collisions between aircrafts and birds cause a considerable amount of damage every year and may result in dangerous situations, even including the aircraft crashing to the ground.

Accordingly, it would be beneficial to provide improved means for avoiding collisions between birds and helicopters.

SUMMARY

Exemplary embodiments of the invention include a method of operating a helicopter search light as an anti-bird-collision light by operating the helicopter search light in a flash light mode. This in particular includes switching the helicopter search light periodically on and off.

In this way, helicopter search lights, which most helicopters are equipped with, can be used for preventing bird collisions. The avoiding of bird collisions can be improved without installing an additional light unit. Accordingly, the risk of bird collisions can be reduced without the need of mounting additional heavy and bulky structures to the helicopter, which are detrimental to the helicopter flight behavior and which are costly.

Helicopter search lights are generally provided for illuminating the environment of the helicopter, in particular for illuminating the ground in an area in front of and below the helicopter. Such helicopter search lights are in particular used for inspecting the ground for potential obstacles, such as power lines, tress, etc., during a landing approach. Already installed helicopter search lights may be re-configured for being operated as an anti-bird collision light, thus allowing for a retro-fitting of the claimed method in existing helicopter search lights. New helicopter search lights may be configured with the claimed anti-bird-collision light functionality upon manufacture.

It has been found that the flashing of the helicopter search light is useful for scaring birds away. It has been found that a useful bird scaring range can be achieved with the high light intensities of helicopter search lights in a weight- and cost-efficient manner. As compared to prior approaches, where separate/additional light units were tested for anti-bird-collision purposes, using the helicopter search light as an anti-bird-collision light is a very effective and efficient way of improving the avoidance of bird collisions.

Exemplary embodiments of the invention also include a helicopter anti-bird-collision system comprising a search light and a control unit, wherein the control unit is configured for operating the search light as an anti-bird-collision light in a flash light mode by switching the search light periodically on and off.

According to exemplary embodiments of the invention, a helicopter search light, which is installed at the helicopter and which is able to provide light having a high intensity, is used as an anti-bird-collision light.

As a result, the risk of collisions between the helicopter and birds crossing the pathway of the helicopter is considerably reduced. Since, according to exemplary embodiments of the invention, an already existing search light is used as an anti-bird-collision light, neither the weight nor the costs of the helicopter are considerably increased.

According to a further embodiment, the direction of light emission of the helicopter search light is moved between at least two positions. Moving the direction of light emission of the helicopter search light enlarges the area covered by the light emission from which birds are scared away. Moving the direction of light emission therefore enhances the effect of reducing the risk of bird strike.

According to a further embodiment, the method includes moving the direction of light emission of the helicopter search light along a cone having an elliptic cross section. The major axis of the elliptic cross section in particular may be oriented basically horizontally, and the minor axis of the elliptic cross section in particular may be oriented basically vertically in space. Usually the velocities of helicopters and birds are much larger in the horizontal direction than in the vertical direction. Moving the direction of light emission of the helicopter search light along a cone having an elliptic cross section therefore enhances the efficiency of scaring away birds which have a high risk of colliding with the helicopter.

An elliptic cross section having a horizontally oriented major axis, in particular a horizontally oriented major axis that is five times larger than the vertically oriented minor axis of the elliptic cross section, has shown as being very efficient in avoiding birds colliding with the helicopter.

According to a further embodiment, the major axis of the elliptic cross section corresponds to an angle of 40°. In particular, the major axis of the elliptic cross section may correspond to a change of the direction of light emission of +/−20° with respect to a forward flight direction. The extension of the minor axis of the ellipse in particular may be ⅕ of the extension of the major axis, i.e. it may correspond to an angle of +/−4°.

According to a further embodiment, the helicopter search light is switched on and off while the direction of light emission of the helicopter search light moves along an elliptic pathway. The helicopter search light in particular may be switched on and off with a frequency such that the combination of light cones emitted by the helicopter search light when switched on covers the pathway substantially completely, in particular completely. As there are no "holes" in the pathway, birds are scared away very efficiently with such a configuration.

According to an embodiment, for covering the whole pathway, the helicopter search light may flash between 2 and 20 times, in particular 4, 6, 8, 10, 12, or 14 times, during each cycle of the direction of light emission moving along the elliptic pathway. In other words, the helicopter search light may emit light flashed in between 2 and 20 positions, in particular in 4, 6, 8, 10, 12 or 14 positions. Such a configuration has proven as being very efficient for avoiding collisions between birds and helicopters.

According to a further embodiment, the helicopter search light may flash at least once per second in each of its light emission positions. In other words, the helicopter search light may be moved to cycle through its light emission positions in such a way that it flashes at least once per second in each of its light emission directions. As the flashing is carried out in a periodic manner and as the motion of the direction of light emission may be continuous, the light emission positions may change from cycle to cycle. However, the frequency of the flash light mode and the motion of the direction of light emission along the pathway may be such that the pathway is covered substantially completely at least once per second. With each direction of light emission being illuminated at least once per second, an effective scaring away of birds may be achieved for normal helicopter speeds.

According to a further embodiment, the helicopter search light comprises at least one light source having an LED. LEDs have a high efficiency and generate less heat than other kinds of light sources. LEDs also have a long lifetime even when periodically switched on and off in the flash light mode.

According to a further embodiment, the helicopter search light is configured to provide a light intensity of at least 300,000 cd, in particular a light intensity of at least 300,000 cd in a peak intensity direction and a light cone having a half beam-angle of about 3°. The light intensity may also be at least 350,000 cd. Such a light intensity allows for scaring away birds in a distance up to 100 m from the helicopter, which usually is large enough for avoiding collisions with the helicopter, in particular when the helicopter operates at normal helicopter speeds. In particular, it has been found that the given light intensity provides for a particularly effective bird-disturbing illuminance at distances from the helicopter that allow for bird reactions before the helicopter reaches the bird locations at normal helicopter speeds.

According to a further embodiment, the helicopter search light has a flood light mode and a spot light mode, which sometimes also is called "search mode" or "pencil mode". The helicopter search light can be operated in the flood light mode or in the spot light mode. When the helicopter search light is operated in the spot light mode, a narrow beam of light is emitted from the helicopter search light. When the helicopter search light is operated in the flood light mode, the light is emitted from the helicopter search light is distributed over an area which is considerably lager than in the spot light mode. The flood light mode therefore allows illuminating a wide area of the ground, in particular when the helicopter is flying in a low height relatively close to the ground. Alternatively the light emitted by the helicopter search light is concentrated to a relatively small area ("spot") in the spot light mode. This in particular may be preferable when the helicopter is flying at larger heights with more distance from the ground. In this situation, the amount of light reaching the ground in the flood light mode would not provide sufficient illumination.

According to an embodiment, the helicopter search light is operated in the spot light mode when used as an anti-bird-collision light in order to increase the range of the light emitted by the helicopter search light as far as possible. In other words, the step of operating the helicopter search light in the flash light mode may include periodically switching the spot light mode of the helicopter search light on and off.

According to a further embodiment, the helicopter search light comprises a drive unit which is configured for moving the direction of light emission of the helicopter search light. In particular, the helicopter search light may have a light head, to which the at least one light source, in particular the at least one LED, is mounted. The drive unit is coupled to the light head and is configured to move the orientation of the light head. In this way, the drive unit is able to move the direction of light emission of the helicopter search light via moving the light head. The drive unit may move the light head in two dimensions. In this way, the direction of light emission of the helicopter search light may be moved along a cone by the drive unit.

BRIEF DESCRIPTION OF THE DRAWINGS

Further exemplary embodiments are described with respect to the accompanying drawings, wherein:

FIG. 3b shows a cross-sectional view through the helicopter search light of FIG. 3a;

DETAILED DESCRIPTION

Figure 1:
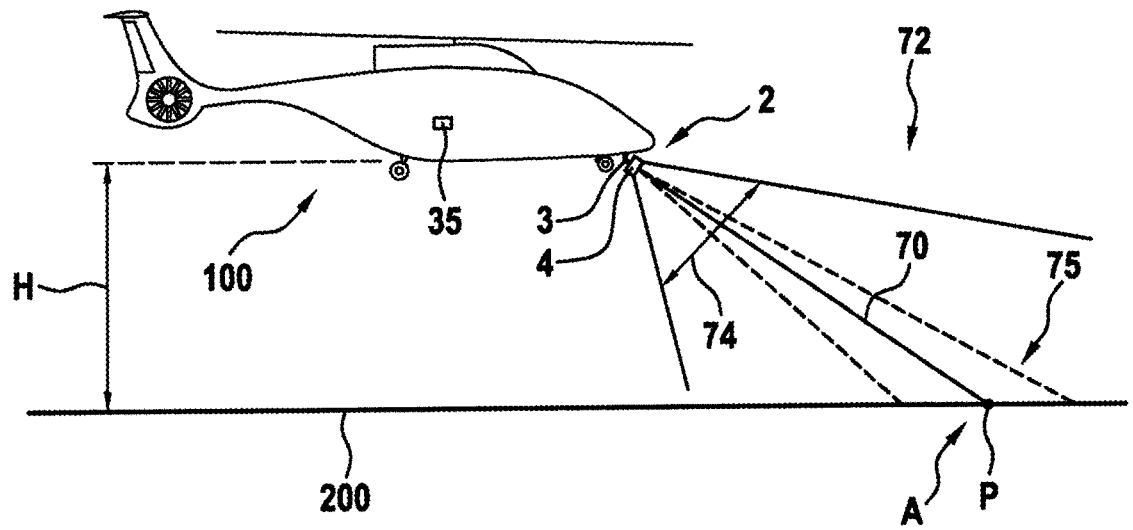
FIG. 1 shows a helicopter comprising a helicopter search light in accordance with an exemplary embodiment of the invention.

FIG. 1 shows a helicopter 100 flying in a height H above a ground 200. The helicopter 100 is equipped with a helicopter search light 2 providing an adjustable light source and mounted to a front bottom portion of the helicopter 100. A line 70 indicates the main direction of the light emission of the helicopter search light 2.

The helicopter search light 2 comprises a light head 4 mounted to the fuselage of the helicopter 100 by means of a drive unit 3 which is configured to allow rotating the light head 4 around two axes, in particular around two axes extending perpendicular to each other, in order to direct the main light emission direction 70 in the desired direction. The drive unit 3 may be a conventional drive unit 3, as it is disclosed for example in US 2013/0182449 A1, which is incorporated herein by references.

Figure 2:
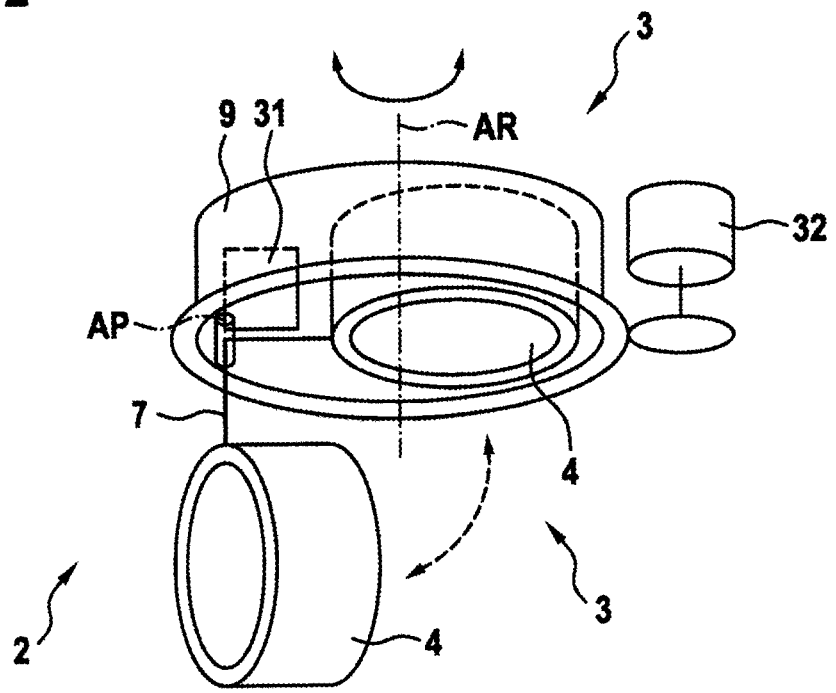
FIG. 2 shows an exemplary embodiment of a drive unit of a helicopter search light in accordance with an exemplary embodiment of the invention.

An example of such a conventional drive unit 3 is schematically shown in FIG. 2. In this embodiment, the light head 4 is supported by a mounting arm 7, the mounting arm 7 being pivotable around two axes AR, AP extending perpendicularly to each other. In the exemplary embodiment shown in FIG. 2, the first axis AR extends vertically in the plane of FIG. 2, while the second axis extends horizontally orthogonally to the plane of FIG. 2. The mounting arm 7 is pivotally mounted to a tubular housing 9 for pivoting about the first axis AP between a retracted position in which the light head 4 is inside the housing 9, and a deployed position in which the light head 4 emerges at least in part from the housing 9. The mounting arm 7 is drivable for pivoting about the first axis AP using a first motor 31 for enabling the light head 4 to be pointed in elevation relative to the helicopter 100. In order to point the light head 4 in azimuth relative to the helicopter 100, the housing 9 is rotatable about the second axis by means of a second motor 32. In consequence, the main light emission direction 70 of the helicopter search light 2 may be oriented in the desired direction by appropriately controlling the two motors 31, 32, with the two motors forming the drive unit 3 of the helicopter search light 2 in the exemplary embodiment of FIG. 2. The housing 9 may be received in a cavity formed in an outside wall of the helicopter 100.

In an alternative embodiment, which is not shown in the Figures, the drive unit 3 employs an inverse differential gear assembly for rotating/pivoting the light head. An example of such an inverse differential gear assembly is disclosed by EP 2 832 647 A1, which is also incorporated herein by reference. Many other embodiments of the drive unit are possible as well.

The helicopter search light 2 may have at least two modes of operation, namely a flood light mode and a spot light mode. The spot light mode sometimes is called "search mode" or "pencil mode". When the helicopter search light 2 is operated in the spot light mode, a narrow beam of light 75, as it is schematically depicted by the dashes lines in FIG. 1, is emitted from the helicopter search light 2 substantially in the direction of the line representing the main light emission direction 70. In the spot light mode, the light emitted from the helicopter search light 2 is bundled along the main light emission direction 70. As a result, the ground 200 in an area A around a position P, at which the line representing the main light emission direction 70 meets the ground 200, is brightly illuminated thereby allowing for a close and thorough inspection by the pilot.

In the flood light mode, the lighting power of the helicopter search light 2 is distributed in a broader cone (not shown) arranged around the main light emission direction 70. Employing the flood light mode, the pilot may inspect a larger portion of the ground than in the spot light mode without adjusting the direction of light emission. Since in the flood light mode the lighting power provided by the helicopter search light 2 is distributed over a larger angular region and thus over a larger area than in the spot light mode, the illuminance of the ground is less than in the spot light mode. Therefore the flood light mode usually is used only when the helicopter 100 is flying in a low height H close to the ground 200. Due to the reduced distance form the ground 200, in this situation, the amount of light reaching the ground 200 in the flood light mode is sufficient for inspection.

Figure 3A:
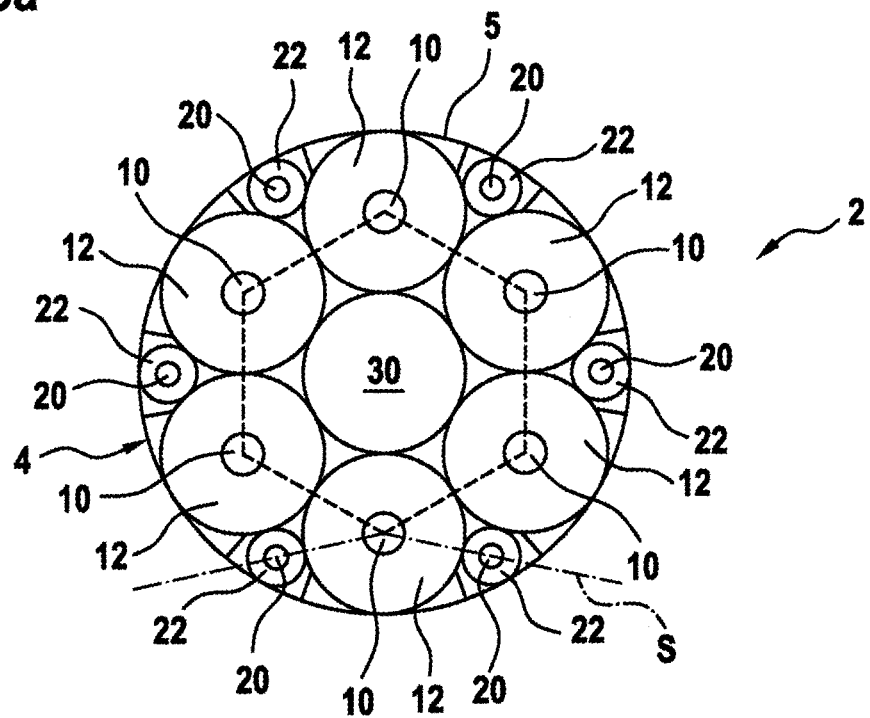
FIG. 3a shows a top view of a helicopter search light in accordance with an exemplary embodiment of the invention.

FIG. 3a depicts a top view of a light head 4 of a helicopter search light 2 in accordance with an exemplary embodiment of the invention.

The light head 4, whose upper edge is shown as a circle in the top view of FIG. 3a, comprises a cylindrical side wall 5. Six first light emitting elements 10 and six second light emitting elements 20 are arranged within the light head 4, respectively.

Each of the first and second light emitting elements 10, 20 is associated with a corresponding optical system 12, 22. Each of the first light emitting elements 10 has a respective first optical system 12 associated therewith, and each of the second light emitting elements 20 has a respective second optical system 22 associated therewith.

In the exemplary embodiment of FIG. 3a, the first optical systems 12 are of identical design. The respective combinations of the light emitting elements 10, 20 and the optical systems 12, 22 are also cylindrical in shape.

The combinations of the first light emitting elements 10 and the corresponding optical systems 12 have a size that allows for arranging six of these combinations within the light head 4 forming the corners of an equilateral (virtual) hexagon, which is indicated by a dotted line in FIG. 3a.

Six second light emitting elements 20 are arranged in spaces provided between said six combinations, respectively consisting of said first light emitting elements 10 and the associated optical systems 12, and the cylindrical side wall 5 of the light head 4. Each of the second light emitting elements 20 is associated with a respective second optical system 22.

The first light emitting elements 10 and the associated optical systems 12 provide for the highly collimated output light intensity distribution in the spot light mode. The second light emitting elements 20 and the associated optical systems 22 provide for the wider output light intensity distribution in the flood light mode.

The helicopter search light 2 further may comprise a light detector 30, which is arranged at the center of the (virtual) hexagon formed by the first light emitting elements 10. In an alternative configuration, a seventh first light emitting element 10 or a third light emitting element emitting a different kind of light, e.g. light having a different wavelength than the first light emitting elements 10, may be arranged at the center of the hexagon formed by the first light emitting elements 10.

Figure 3B:
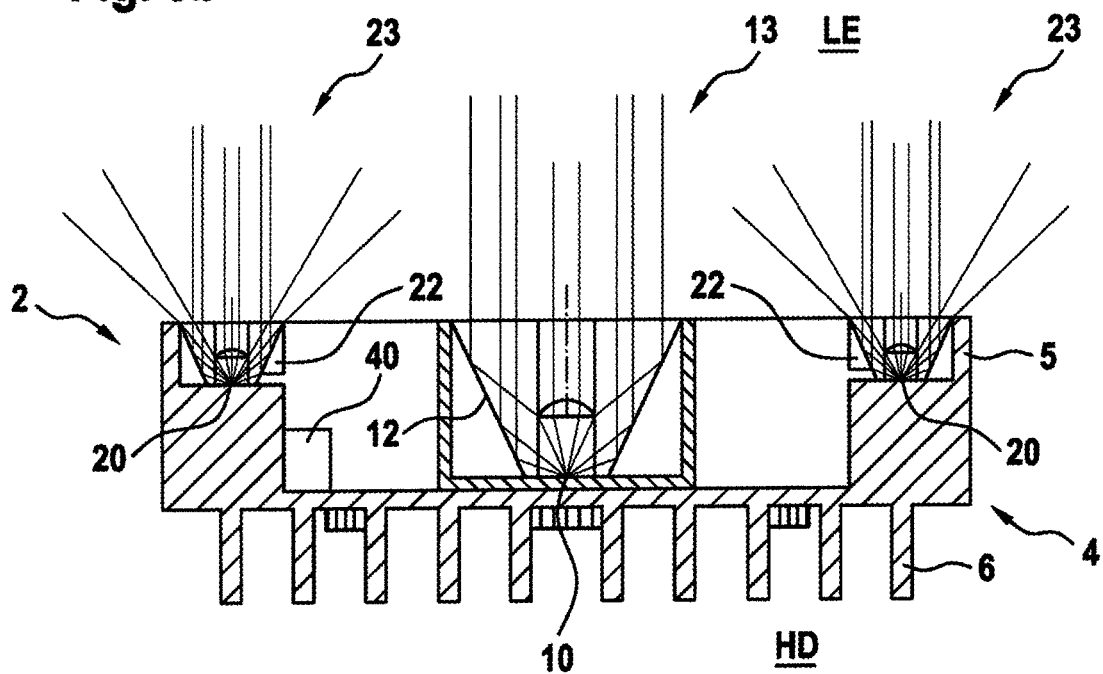

FIG. 3b depicts a cross-sectional view of the helicopter search light 2 shown in FIG. 3a. The cross-sectional plane of FIG. 3b is oriented along line S drawn in FIG. 3a. The cross-sectional view of FIG. 3b in particular illustrates the straight extension (in the top/bottom dimension) of the cylindrical side wall 5 of the light head 4. The helicopter search light 2 has a light emission side LE, depicted as the top side in the viewing plane of FIG. 3b, and a heat discharge side HD, depicted as the bottom side in the viewing plane of FIG. 3b. For said heat discharge, the light head 4 is equipped with a cooling rib structure 6, which forms a heat sink for the light emitting elements arranged within the light head 4.

A first light emitting element 10 is illustrated in the center of the cross-sectional view shown in FIG. 3b. A first optical system 12 is arranged above and around the first light emitting element 10. The first optical system 12 comprises a collimating lens and/or a collimating reflector. As illustrated by the exemplary light rays 13 of FIG. 3b, the collimating lens and the collimating reflector alter the direction of the light rays 13, emitted by the first light emitting element 10, in such a way that they all leave the helicopter search light 2 in substantially the same direction, namely towards the top in the viewing plane of FIG. 3b.

Two second light emitting elements 20 that are arranged adjacent the cylindrical side wall 5 of the light head 4 on opposite sides of the light head 4 are visible in the cross-sectional view of FIG. 3b. In other words, one second light emitting element 20 is arranged adjacent the side wall 5 of the light head 4 on the right side of the helicopter search light 2 in the viewing plane of FIG. 3b, while the other second light emitting element 20 is arranged adjacent the side wall 5 of the light head 4 on the left side of the helicopter search light 2 in the viewing plane of FIG. 3b.

Each of the two second light emitting elements 20 comprises a second optical system 22 associated therewith. The second optical systems 22 are arranged above and around the second light emitting elements 20 in the viewing plane of FIG. 3b. In the exemplary embodiment of FIGS. 3a and 3b, each second optical system 22 comprises a reflector. The reflector is configured for reflecting a portion of the light emitted by the respective second light emitting element 20 towards the main light emission direction, i.e. towards the direction normal to the light head 4, i.e. normal to the whole light head 4. Much of the light of the second light emitting elements 20, however, leaves the light head 4 in an unaltered manner. Overall, the second optical system 22 is designed in such a way that a controlled stray light distribution leaves the light head 4. This is illustrated by the exemplary light rays 23 of FIG. 3b. It is also possible to provide second optical systems 22 that each have a lens for shaping the output light intensity distribution in the flood light mode and for reaching a controlled stray light distribution.

The first and second light emitting elements 10, 20 may comprise LEDs, in particular LEDs emitting light in the visible light range, i.e. light that is visible to the human eye.

The helicopter search light 2 is electrically connected to a control unit 35 (see FIG. 1) including a switching circuit. The switching circuit is electrically coupled to an electrical power source (not shown), as well as to the first and second light emitting elements 10, 20. The switching circuit allows to selectively switch the first and second light emitting elements 10, 20 on and off. The switching circuit in particular allows to selectively switch between the spot light mode, in which the first light emitting elements 10 are switched on and the second light emitting elements 20 are switched off; and the flood light mode, in which the second light emitting elements 20 are switched on and the first light emitting elements 10 are switched off. The switching circuit further may allow to operate the helicopter search light 2 in a combined mode in which both, the first and second light emitting elements 10, 20, are switched on simultaneously. It is also possible that the control unit 35 is integrated into the helicopter search light 2 and that high level command signals, such as "spot light on", "flood light on" or "anti-bird-collision mode on", are transmitted from the pilot or from the board computer. The control of the individual light emitting elements 10, 20 is then carried out within the helicopter search light 2.

Figure 4:
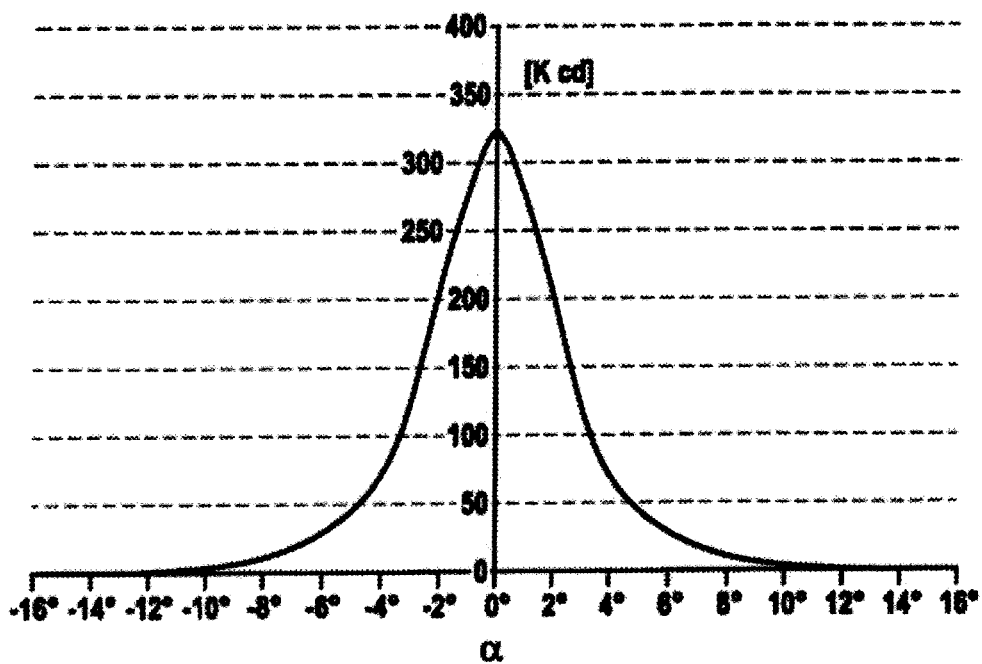
FIG. 4 illustrates an exemplary angular intensity distribution of the light emitted by the helicopter search light according to an exemplary embodiment of the invention.

FIG. 4 illustrates an angular intensity distribution of the light emitted by the helicopter search light 2 according to an exemplary embodiment of the invention operated in the spot light mode.

The light cone emitted by the light source 2 has a half beam angle of approximately 3° and a peak intensity at the center of the beam (at an angle α of 0°) of 310,000 to 320,000 cd. Thus, FIG. 4 shows that the light emitted by the light source 2 is concentrated in a narrow beam having an opening angle of approximately 6°.

When operated as an anti-bird-collision light, the exemplary helicopter search light 2 is operated in the spot light mode for extending the range of light distribution, which is sufficiently bright for scaring away the birds, as far as possible.

For enhancing the effect and for covering an increased area in front the of the helicopter 100, the direction of light emission 70 of the helicopter search light 2 may be moved by operating of the drive unit 3 for moving the direction of light emission 70 along a cone 72, in particular a cone 72 having an elliptic cross section 74 (see FIG. 1). The drive unit 3 in particular may be driven by the control unit 35. Again, the control unit 35 may also be integrated into the helicopter search light 2.

Figure 5:
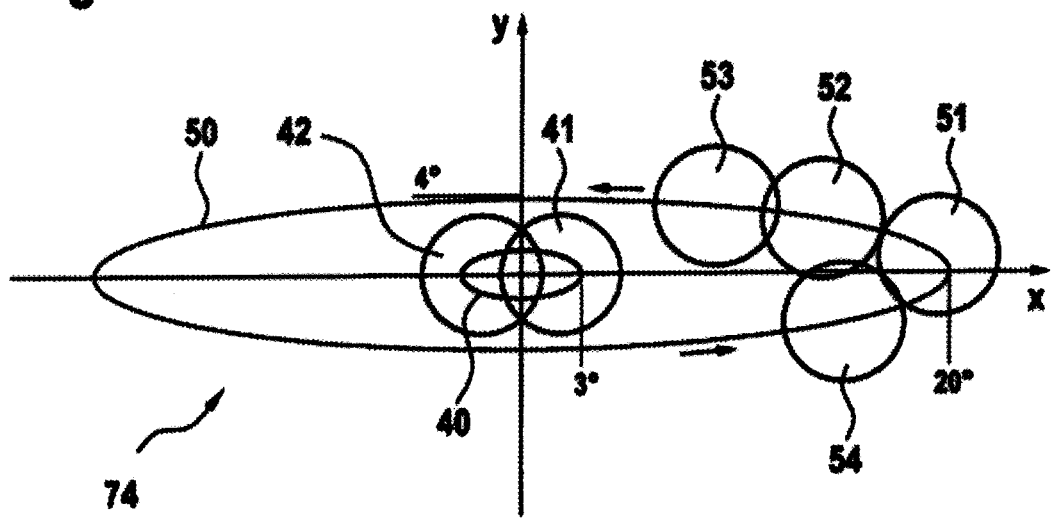
FIG. 5 schematically illustrates an elliptic cross section of the cone described by the direction of light emission of the helicopter search light.

A schematic view of said elliptic cross section 74 in polar coordinates in depicted in FIG. 5. In particular, two extremes of possible pathways 40, 50 are illustrated in FIG. 5.

A first pathway 50 has a horizontal extension (major axis of the ellipse along the x-axis) of +/−20°, and a vertical extension (minor axis of the ellipse along the y-axis) of ⅕ of the horizontal extension, i.e. a vertical extension of +/−4°:

In the example shown in FIG. 5, the light cones 51, 52, 53, 54 of the helicopter search light 2 have an opening angle of 6°, respectively. In order to cover the whole first pathway 50, the helicopter search light 2 is operated to flash 14 times during each cycle of the direction of light emission 70 along the pathway 50.

In an embodiment, the direction of light emission 70 completes a full cycle along the pathway 50 in one second. In case, however, the drive 3 which is used for moving the direction of light emission 70 is not fast enough in order to fulfill this requirement, the dimensions of the cone 72 may be reduced.

An exemplary second pathway 40, which is shown in FIG. 5 extends from −3° to +3° in the horizontal direction (x-axis) and from −1.5° to +1.5° in the vertical direction (y-axis). In this case, only two flashes 41, 42 of the helicopter search light 2 are necessary for covering the whole pathway 40.

It is pointed out that other pathways are possible as well. In particular, elliptic pathways with extensions between the exemplary first pathway 50 and the exemplary second pathway 40 are possible, with the number of light flash positions being adjusted accordingly. Moreover, pathways having shapes that are not elliptic are possible as well.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A method of operating a helicopter search light, which may be operated in a flood light mode and a spot light mode, as an anti-bird-collision light wherein the method includes: operating the helicopter search light in a flash light mode by periodically switching the helicopter search light, operating in the spot light mode, on and off; and moving a direction of light emission of the helicopter search light along an elliptic pathway such that a combination of light cones emitted by the helicopter search light when switched on covers the elliptic pathway substantially completely; wherein said moving of the direction of light emission over a full cycle along the elliptic pathway takes at most one second, and wherein the helicopter search light is operated to flash between 2 and 14 times during the moving of the direction of light emission over the full cycle.

2. The method according to claim 1, wherein the elliptic cross section has a major axis and a minor axis and wherein the major axis is oriented horizontally.

3. The method according to claim 1, wherein the major axis of the of the elliptic cross section corresponds to an angle of 40°.

4. The method according to claim 1, wherein the helicopter search light is switched on and off while the direction of light emission of the helicopter search light moves along an elliptic pathway, wherein the helicopter search light in particular is switched on and off with a frequency such that the combination of light cones emitted by the helicopter search light covers the elliptic pathway substantially completely.

5. The method according to claim 2, wherein the major axis is at least five times larger than the minor axis.

6. A helicopter anti-bird-collision system including: a helicopter search light, which may be operated in a flood light mode and a spot light mode; and a control unit which is configured for operating the helicopter search light as an anti-bird-collision light in a flash light mode by periodically switching the helicopter search light, operating in the spot light mode, on and off; wherein the helicopter search light has an adjustable direction of light emission and wherein the helicopter anti-bird collision system further comprises a drive unit which is configured for moving the direction of light emission of the helicopter search light; wherein the drive unit is configured for moving the direction of light emission of the helicopter search light along an elliptic pathway so that said moving of the direction of light emission of a combination of light cones over a full cycle along the elliptic pathway takes at most one second; and wherein the control unit is configured for operating the helicopter search light to flash between 2 and 14 times during the moving of the direction of light emission over the full cycle.

7. The helicopter anti-bird-collision system according to claim 6, wherein the helicopter search light comprises at least one LED light source.

8. The helicopter anti-bird-collision system according to claim 6, wherein the helicopter search light is configured to provide a light intensity of at least 300,000 cd, in particular a light intensity of at least 300,000 cd in a peak intensity direction and a light cone having a half beam angle of about 3°.

9. The helicopter anti-bird-collision system according to claim 6, wherein the major axis of the elliptic cross section is oriented horizontally.

10. The helicopter anti-bird-collision system according to claim 6, wherein the control unit is configured to switch the helicopter search light on and off while the direction of light emission of the helicopter search light moves along an elliptic pathway, wherein the control unit in particular is configured for switching the helicopter search light on and off with a frequency such that the light cones emitted by the helicopter search light in combination cover the elliptic pathway substantially completely.

* * * * *